United States Patent [19]

Boon et al.

[11] Patent Number: 4,558,096

[45] Date of Patent: Dec. 10, 1985

[54] HIGH PERFORMANCE RUBBER-POLYESTER BLENDS

[75] Inventors: Wyndham H. Boon, North Canton; James N. Henderson, Hudson, both of Ohio

[73] Assignee: The Goodyear Tire & Rubber Company, Akron, Ohio

[21] Appl. No.: 616,988

[22] Filed: Jun. 4, 1984

Related U.S. Application Data

[63] Continuation-in-part of Ser. No. 475,288, Mar. 14, 1983, abandoned.

[51] Int. Cl.⁴ .................. C08L 67/02; C08L 23/16
[52] U.S. Cl. ......................... 525/166; 525/168; 525/171; 525/174; 525/176; 525/177
[58] Field of Search ........... 525/166, 176, 177, 168, 525/171, 174

[56] References Cited

U.S. PATENT DOCUMENTS

| | | | |
|---|---|---|---|
| 4,219,628 | 8/1980 | Weemes | 525/177 |
| 4,251,644 | 2/1981 | Joffrion | 525/177 |
| 4,299,927 | 11/1981 | Dombroski | 525/64 |
| 4,368,295 | 1/1983 | Newton | 525/177 |

FOREIGN PATENT DOCUMENTS 0044616  1/1982  European Pat. Off. .

*Primary Examiner*—John C. Bleutge
*Assistant Examiner*—Patricia Short

*Attorney, Agent, or Firm*—Alvin T. Rockhill

[57] ABSTRACT

This invention specifically relates to blends of grossly incompatible polymers (polyethylene terephthalate and rubber) which are blended with a dispersion stabilizer (compatibilizing agent) to obtain optimum properties, particularly impact strength. The dispersion stabilizers disclosed herein are alkenyl succinic anhydrides wherein said alkenyl group contains from 8 to 30 carbon atoms; alkyl succinic anhydrides wherein said alkyl group contains from 8 to 30 carbon atoms; and dimers, oligomers, and polymers of the structural formula:

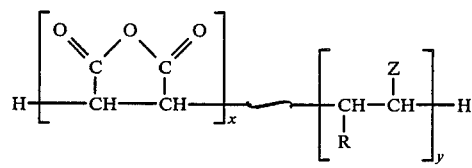

wherein x and y are integers, wherein R and Z can be the same or different, wherein R and Z are selected from the group consisting of alkyl moieties containing from 1 to 30 carbon atoms, alkenyl moieties containing from 2 to 30 carbon atoms, and hydrogen, wherein the total number of carbon atoms in R and Z is between 8 and 30, and wherein the ⌇ indicates that the repeat units can be distributed in any order.

20 Claims, No Drawings

HIGH PERFORMANCE RUBBER-POLYESTER BLENDS

This application is a continuation-in-part of Ser. No. 475,288, filed Mar. 14, 1983 (now abandoned).

BACKGROUND OF THE INVENTION

There has been increased usage in recent years of thermoplastic polymers for molding of useful articles. Presently there is a wide variety of different types of articles being molded utilizing thermoplastic resins. They range from small articles to large articles, and from articles that require a high service strength to articles that require only low service strength.

One of the most desirable classes of thermoplastic polymers used for molding articles for high strength service application is polyester. Certain thermoplastic polyesters for molding articles for high strength service have proved to be most desirable. For instance, one of the more desirable polyesters is polyethylene terephthalate because this polymer exhibits a desirable overall balance of most chemical, electrical, and mechanical properties, such as tensile strength, flexural modulus, hardness, abrasion resistance and the like. In contrast, articles manufactured by injection molding using polyethylene terephthalate have a rather low impact resistance. The poor impact strength of articles molded from polyethylene terephthalate has been a factor that has limited its use as a resin in molding where high impact strengths are required.

Some other thermoplastic polyesters that have been limited in use as thermoplastic molding compositions due to their low impact strength include polytetramethylene terephthalate and poly(1,4-cyclohexylene dimethylene terephthalate).

It would be very beneficial to improve the impact strength of such polyesters used for molding purposes, particularly, polyethylene terephthalate (PET). Engineering plastics prepared by blending rubber and polyesters achieve this goal and provide an excellent combination of properties including high strength, excellent surface hardness, high flexural properties, good abrasion resistance, high heat distortion temperatures, low creep, and easy processing. However, blending rubber with plastic presents some basic problems which include incompatibility, lack of interfacial adhesion and large variations in melt viscosity which effect the quality of the dispersion. Such polyester rubber blends also require high processing temperatures which tend to degrade the polymer. Incompatibility is the major difficulty to be overcome in order to produce a high performance a rubber-plastic blend. The incompatibility of a given plastic and rubber can be determined by comparing the solubility parameters (δ) of the plastic and the rubber. As a rule of thumb if the difference between the solubility parameters of the plastic and rubber is equal to or greater than one then poor compatibility between the plastic and rubber phases will result. For example, rubbers have a solubility parameter of 8.6 or less and polyethylene terephthalate has a solubility parameter of 10.7, therefore, there will be poor interfacial interactions between the polymers. For example, there might be poor adhesion between PET and rubber.

It is, therefore, necessary to improve the interfacial adhesion between PET and rubber in blends of these dissimilar polymers in order to obtain the high performance properties desired. For example, increased interfacial adhesion will allow more effective energy transmission during impact which will increase impact strength. In order to improve interfacial adhesion, it is necessary to employ a compatibilizing agent. Such a compatibilizing agent attaches the two phases together, chemically and/or physically.

This invention specifically relates to blends of grossly incompatible polymers (PET and rubber) which are blended with an interfacial bonding agent (compatibilizing agent) to obtain optimum properties. The blending of dissimilar polymers is not new in the art. However, generally such blends have been limited to the blending of chemically similar rubbers and plastics. This invention discloses a technique for blending PET and rubbers which are grossly dissimilar and yields a blend that has an excellent balance of properties, particularly suitable for injection molding purposes.

SUMMARY OF THE INVENTION

This invention discloses a composition having a balance of properties suitable for molding purposes and having high impact resistance, said composition comprising an admixture of (a) from about 10 to about 90 percent by weight polyethylene terephthalate;

(b) from about 10 to about 90 weight percent of at least one rubber selected from the group consisting of EPDM rubbers and EPR rubbers; and (c) from about 0.001 to about 2.0 weight percent of at least one member selected from the group consisting of alkyl succinic anhydrides wherein said alkyl group contains from 8 to 30 carbon atoms, alkenyl succinic anhydrides wherein said alkenyl group contains from 8 to 30 carbon atoms, and dimers, oligomers, and polymers of the structural formula:

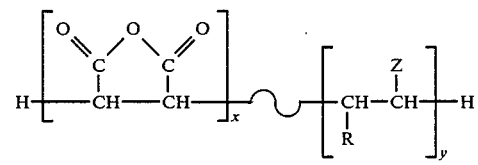

wherein x and y are integers, wherein R and Z can be the same or different, wherein R and Z are selected from the group consisting of alkyl moieties containing from 1 to 30 carbon atoms, alkenyl moieties containing from 2 to 30 carbon atoms, and hydrogen, wherein the total number of carbon atoms in R and Z is between 8 and 30, and wherein the ⁀⁀ indicates that the repeat units can be distributed in any order.

This invention also reveals a composition having a balance of properties suitable for molding purposes and having high impact resistance, said composition comprising an admixture of (a) from about 10 to about 90 percent by weight of a polymer with a structural formula selected from the group consisting of:

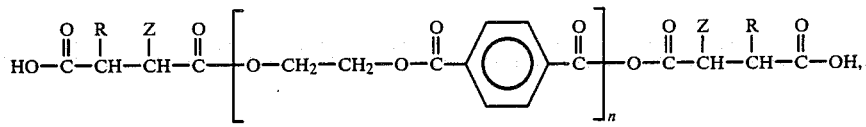

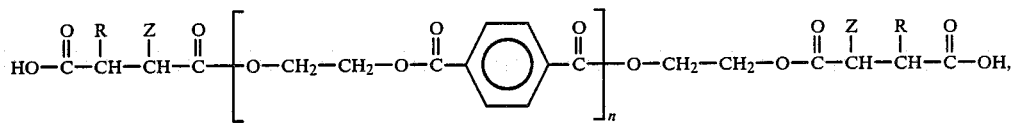

and

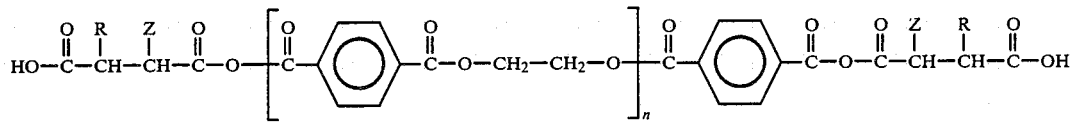

wherein n is an integer ranging from about 50 to about 750, wherein R and Z are members selected from the group consisting of alkyl groups containing from 8 to 30 carbon atoms, alkenyl moieties containing from 8 to 30 carbon atoms, and hydrogen, with the proviso that when R is a member selected from the group consisting of alkyl groups and alkenyl groups, then Z is hydrogen, and with the proviso that when Z is a member selected from the group consisting of alkyl groups and alkenyl groups, then R is hydrogen; and (b) from about 10 to about 90 weight percent of at least one rubber selected from the group consisting of EPDM rubbers and EPR rubbers.

This invention also discloses a process for producing an impact resistant molding composition which comprises distributing throughout polyethylene terephthalate from about 10 to 90 weight percent, based on the total weight of the composition, of at least one member selected from the group consisting of EPDM rubbers and EPR rubbers and from about 0.001 to 2 weight percent, based on the total weight of the composition, of at least one member selected from the group consisting of alkyl succinic anhydrides, wherein said alkyl moiety contains from 8 to 30 carbon atoms; alkenyl succinic anhydrides, wherein said alkenyl moiety contains from 8 to 30 carbon atoms; and dimers, oligomers, and polymers of the structural formula:

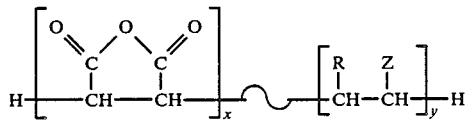

wherein x and y are integers, wherein R and Z can be the same or different, wherein R and Z are members selected from the group consisting of alkyl groups containing from 8 to 30 carbon atoms, alkenyl groups containing 8 to 30 carbon atoms, and hydrogen, wherein the total number of carbon atoms in R and Z is between 8 and 30, and wherein ⌒⌣ indicates that the repeat units can be distributed in any order, at a temperature of about 260° C. to about 300° C.

DETAILED DESCRIPTION

The dispersion stabilizers that are useful in this invention include alkyl succinic anhydrides wherein said alkyl groups contains from 8 to 30 carbon atoms, alkenyl succinic anhydrides wherein said alkenyl groups contain from 8 to 30 carbon atoms, and dimers, oligomers, and polymers with the structural formula:

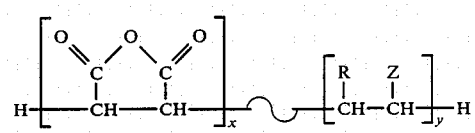

wherein x and y are integers, wherein the total of x and y is from 2 to about 500, wherein R and Z can be the same or different, wherein R and Z are hydrogen, alkyl moieties containing from 1 to 30 carbon atoms, or alkenyl moieties containing from 2 to 30 carbon atoms, wherein the total number of carbon atoms in R and Z is between 8 and 30, and wherein ⌒⌣ indicates that the repeat units can be distributed in any order. In the case of alkyl succinic anhydrides and alkenyl succinic anhydrides x and y are both equal to 1. The alkyl succinic anhydrides that are useful in this invention as dispersion stabilizers can also be represented by the structural formula:

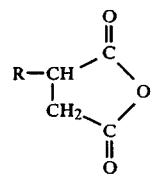

wherein R is an alkyl moiety containing from 8 to 30 carbon atoms. Such alkyl succinic anhydrides are readily commercially available and include octadecyl succinic anhydride, dodecyl succinic anhydrides, and triacontyl succinic anhydrides. The alkenyl succinic anhydrides with the structural formula shown above, wherein R is an alkenyl moiety containing from 8 to 30 carbon atoms, are also useful as dispersion stabilizers in this invention. For instance, such an alkenyl succinic anhydride that has been found to be very useful as a dispersion stabilizer for PET-rubber blends is 2-dodecen-1-yl succinic anhydride. Dimers, oligomers, and polymers of the structural formula:

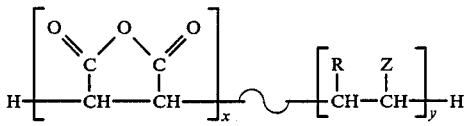

wherein x and y are integers, wherein the total of x and y is from 2 to about 500, wherein R and Z can be the same or different wherein R and Z are hydrogen, alkyl moieties containing from 1 to 30 carbon atoms, or alkenyl moieties containing from 2 to 30 carbon atoms; wherein the total number of carbon atoms in R and Z is between 8 and 30, and wherein the ⌒⌣ indicates that the repeat units can be distributed in any manner are also useful as dispersion stabilizers in this invention. Polymers of this type with molecular weights of 100,000 or even greater are useful as dispersion stabilizes. Polymers of this type that are particularly useful in this invention have the structural formula:

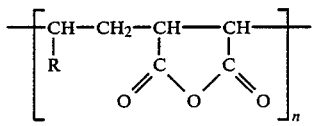

wherein R is an alkyl or alkenyl moiety containing from 8 to 30 carbon atoms and wherein n is an integer from 1 to about 300. Gulf PA-18 is a polymer with this structural formula that is commercially available. More specifically, Gulf PA-18 has a molecular weight of about 50,000 and has the structural formula

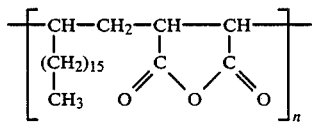

wherein n is about 150.

In order to produce the PET-rubber blends of this invention it is essential that the components of the blend be well mixed. For example, the rubber and the dispersion stabilizer can be distributed throughout the PET using numerous techniques to produce a composition having a balance of properties very suitable for molding purposes and having high impact resistance. This composition is in effect an admixture of the PET, the rubber, and the dispersion stabilizer. In order to satisfactorily mix blends containing PET, it is necessary to raise the temperature above the melting temperature of PET, i.e., to about 260° C. or higher. Generally, this mixing is done at a temperature between about 260° C. and about 300° C. If such a mixing is attempted at a temperature of higher than about 300° C. then generally the rubber will be degraded by the high temperature. Similarly a nitrogen atmosphere is preferred in order to minimize oxidative and/or hydrolytic degradation.

One technique that can be used in preparing such a blend of rubber and PET is to first mix the rubber with the dispersion stabilizer in either a banbury mixer or on mill mixer. This mixture of rubber and the dispersion stabilizer can then be extruder-blended with PET at a temperature between about 260° C. and about 300° C. It is sometimes desirable to freeze and grind the rubber dispersion stabilizer mixture to reduce its particle size before introducing it to the extruder for blending with PET.

Another technique that can be used in preparing PET rubber blends, is to first mix the PET and dispersion stabilizer in a continuous manner using an apparatus that will apply the high shearing forces necessary for thorough mixing. This PET dispersion stabilizer mixture can then be mixed with the rubber again using an apparatus that will apply sufficiently high shearing forces to effectuate a thorough mixing of the rubber throughout this PET dispersion stabilizer mixture. It is also possible to distribute the rubber and dispersion stabilizer simultaneously throughout the PET. Again this can be accomplished using any apparatus that will insure adequate mixing of the three components at a temperature of between about 260° C. and about 300° C. In summary, any means that will adequately mix these components together is satisfactory. It should be noted that a gross mixture of rubber, the dispersion stabilizer and PET will be further mixed in an injection molding machine but that this mixing generally is not adequate to be optimal.

The PET rubber blend compositions of this invention can contain from about 10 to about 90 weight percent PET, from about 10 to about 90 weight percent rubber, and from about 0.001 to about 2 weight percent of the dispersion stabilizer. The PET rubber blend compositions of this invention will generally contain from about 40 to about 85 weight percent PET, from about 15 to about 60 weight percent rubber, and from about 0.005 to about 1 weight percent of the dispersion stabilizer. It is generally preferred for these PET rubber blends to contain from 60 to 80 weight percent PET, from about 20 to about 40 weight percent rubber, and from about 0.01 to 0.5 weight percent of the dispersion stabilizer.

The rubbers that are useful in this invention for blending into PET include EPDM's (ethylene-propylene-diene rubbers) and EPR's (ethylene-propylene rubbers). Some EPDM rubbers that are useful in this invention are terpolymers of ethylene, propylene, and a diene monomer selected from the group consisting of ethylidene norbornene, methylene norbornene, 1,4-hexadiene, dicyclopentadiene, and isoprene, The EPR rubbers that are useful in this invention are simply copolymers of ethylene and propylene.

The EPDM rubbers employed in the blends of this invention should have a number average molecular weight of at least about 5000. EPDM rubbers with number average molecular weights of about 10,000 to 200,000 are generally preferred in the blends of this invention. These EPDM rubbers preferably will contain from about 30 to about 75 weight percent ethylene, from about 25 to about 60 weight percent propylene, and from about 0.5 to about 25 weight percent of the diene monomer. These EPDM rubbers more preferably will contain about 45 to about 65 weight percent ethylene, about 35 to about 50 weight percent propylene, and about 1 to 6 weight percent of the diene termonomer.

The ethylene-propylene rubbers that are useful in the blends of this invention generally have number average molecular weights of about 10,000 to 200,000 and contain from about 30 to about 75 weight percent ethylene and from about 25 to about 70 weight percent propylene.

The PET that can be used in the blends of this invention can have the structural formula:

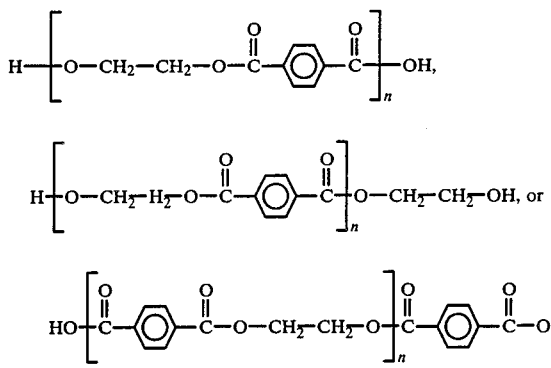

In other words, the PET molecules can have —OH moieties or

moieties at the ends of their molecular chains. It has been determined that it is preferable for the PET used in the blends of this invention to have —OH groups at both ends of its chain. This is because —OH groups (hydroxyl groups) are much more reactive than are

groups (carboxyl groups) in reactions with anhydrides. The molecular weight of the PET used in the blends of this invention is not particularly critical, but generally will range from about 10,000 to about 150,000 (n is about 50 to about 750). It is generally preferred for the PET to have a number average molecular weight of 20,000 to 50,000 (n is about 100 to about 300).

It is to be understood that the PET used in the blends of this invention can contain minor amounts of repeat units derived from monomers other than terephthalic acid and ethylene glycol. For example, small amounts of isophthalic acid can be polymerized into the PET used in the blends of this invention. Minor amounts of other aromatic and/or aliphatic polybasic carboxylic acids, known to those skilled in the art, can also be polymerized in the PET employed in the blends of this invention. Minor amounts of glycols other than ethylene glycol and polyhydric alcohols can also be polymerized into the PET used in the blends of this invention. Thus, the PET that is useful in this invention will contain predominantly terephthalic acid and ethylene glycol repeat units, but can also contain small amounts of repeat units derived from other polybasic carboxylic acids, glycols, and polyhydric alcohols, which are well-known to those skilled in the art. Such a person will generally know how much of these other monomers can be incorporated into the PET without greatly effecting its properties and thus its usefulness in the blends of this invention. As a rule this minor amount will not exceed about 25%. In other cases this amount will be much lower, for example, in the case of polyhydric alcohols not more than about 1% can be incorporated into the PET.

When the dispersion stabilizer is mixed in the PET its anhydride groups react with the terminal hydroxyl and/or carboxyl groups on the PET. For example, dodecyl succinic anhydride will react with PET as follows:

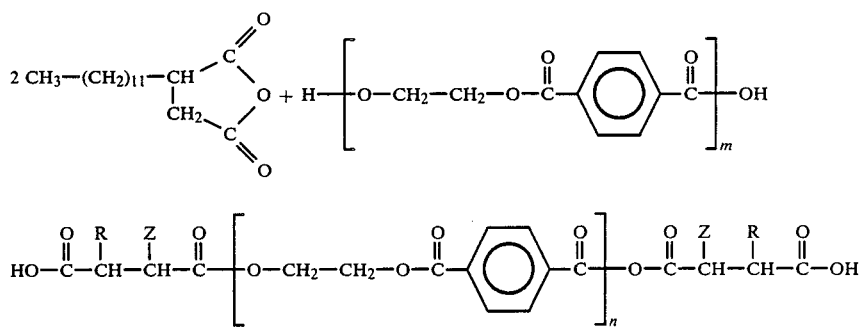

wherein R is a dodecyl group and Z is a hydrogen atom or wherein R is a hydrogen atom and Z is a dodecyl group. In this reaction an anhydride group on a dodecyl succinic anhydride molecule has reacted with a hydroxylgroup (—OH) at one end of the PET molecule and another dodecyl succinic anhydride molecule has reacted with a carboxyl group

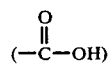

at the other end of the PET molecule. As was pointed out, the hydroxyl groups on the PET are much more reactive than are carboxyl groups and are greatly favored in this reaction. Under some reaction conditions, not all of the carboxyl groups on the PET will react with the dispersion stabilizer with a reaction product of the following type being formed:

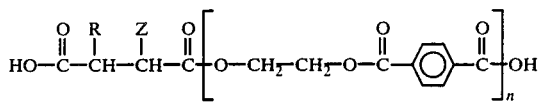

On the other hand, it is possible although statistically less likely for the above shown reaction to produce the following product:

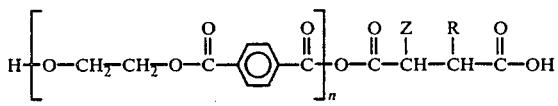

If the dispersion stabilizer used is a dimer, oligomer or polymer with the structural formula:

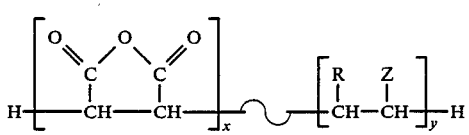

then more than one anhydride group in the molecule can take part in reactions with PET. The same reaction that was described above takes place but very complex reaction products can be formed.

For examples, one such reaction product has the structural formula:

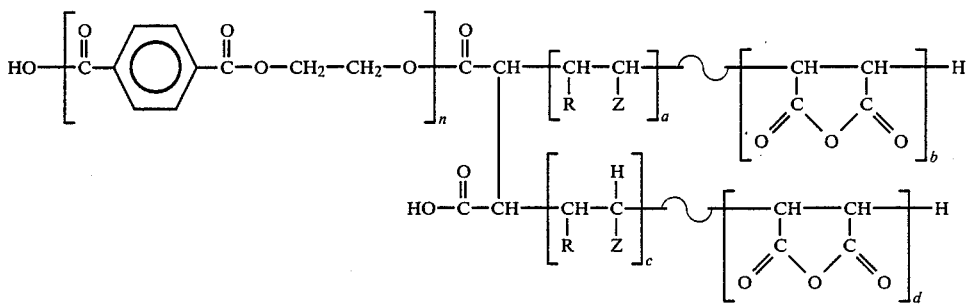

wherein $a+c=y$ and wherein $b+d=x-1$. Thus, there are $x-1$ anhydride groups that can still react with hydroxyl and/or carboxyl groups on PET molecules with the final reaction product being very complex.

The dispersion stabilizers of this invention are believed to improve interfacial adhesion between the rubber phase and the polyester phase of the blends of this invention by covalently bonding with the polyester phase (as described above) with the alkyl and/or alkenyl groups of the dispersion stabilizers being excluded from the polyester phase. These alkyl and/or alkenyl chains are believed to become entangled in the rubber phase resulting in a physical connection between the two phases. It is possible, in the case of the alkenyl stabilizers, for the alkenyl chains to become chemically attached to the rubber phase.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLES 1 THROUGH 13

A series of PET/EPDM blends were prepared. The PET used in these blends was Cleartuf TM 7204 which is sold by The Goodyear Tire & Rubber Company and which has a molecular weight of about 24,000. The EPDM rubber employed in these these blends was Nordel TM 2744 which is sold by E. I. duPont de Nemours & Company. Nordel TM 2744 contains ethylene, propylene, and 1,4-hexadiene; and has a molecular weight of about 180,000.

Various blends of PET and EPDM were prepared by first merely dry blending the appropriate weights of these materials in a one gallon (3.79 liter) can and then feeding the resulting mixture to an extruder. The extruder employed was a one-inch Killion extruder equipped with a Maddox Mixing screw which was run at 125 RPM (revolutions per minute) at a temperature of 550° F. (288° C.) under a nitrogen atmosphere. The extrudate (PET/EPDM blends) was quenched in water and pelletized. It was then dried at a temperature of 212° F. to 230° F. (100° C. to 110° C.) for a period of at least about 15 hours in a vacuum oven. The blends were then injection molded on a Van Dorn injection molder having a 6 ounce (170 gram) injection capacity and having a clamp force of 75 tons. The mold was maintained at 70° F. (21° C.) to produce amorphous test specimens.

Various blends of PET, EPDM, and 2-dodecen-1-ylsuccinic anhydride (DSA) were prepared by first rolling hot (150° C.) dried PET in one gallon (3.79 liter) cans with the appropriate amount of DSA. This mixture was then extruded in the Killion extruder as described above. After the material was extruded it was mixed with the appropriate amount of ground EPDM and injection molded on the Van Dorn molder as described above.

The blends prepared, as described above, all had hard surfaces and were opaque. These blends had PET/EPDM weight ratios of 90/10, 70/30, and 50/50.

They also contained from 0 to 1.40 weight percent DSA (as a dispersion stabilizer).

Tensile properties, flexural properties, impact strength and some other physical properties were determined for all of the blends prepared. Notched Izod Impact Strength was determined using ASTM test method D-256. Stress at yield, elongation at yield, stress at break, elongation at break, flexural strength, flexural modulus, hardness (Shore D), and heat distortion temperature were determined using ASTM test methods D-638, D-790, D-2240, and D-648, respectively.

The physical properties of the blends containing a PET/EPDM ratio of 90/10 are shown in Table I, the physical properties of the blends containing a PET/EPDM ratio of 70/30 are shown in Table II, and the physical properties of the blends containing a PET/EPDM ratio of 50/50 are shown in Table III.

TABLE I

| PHYSICAL PROPERTIES OF BLENDS WITH A PET/EPDM RATIO OF 90/10 | | | | |
|---|---|---|---|---|
| Example | 1 | 2 | 3 | 4 |
| Level of DSA, eq/$10^6$ g PET | 0 | 10 | 20 | 60 |
| Wt % Based on Blend | 0 | .23 | .46 | 1.40 |
| Notched Izod Impact (⅛" Specimen) | | | | |
| Impact Strength, ft-lbs/in. | .44 | 1.30 | 1.57 | .81 |
| Type of Break | Complete | Complete | Complete | Complete |
| Tensile Properties | | | | |
| Stress at Yield, psi | 5800 | 5400 | 4800 | — |

TABLE I-continued

PHYSICAL PROPERTIES OF BLENDS WITH A PET/EPDM RATIO OF 90/10

| Example | 1 | 2 | 3 | 4 |
|---|---|---|---|---|
| Elongation at Yield, % | 6 | 5 | 4 | — |
| Stress at Break, psi | 3400 | 3300 | 3200 | 6000 |
| Elongation at Break, % | 170–340 | 20–300 | 5–25 | 6 |
| Flexural Properties | | | | |
| Flex Strength, psi | 8100 | 7600 | 7900 | 8400 |
| Flex Modulus, psi × $10^3$ | 270 | 270 | 270 | 280 |
| Hardness, Shore D | 75 | 75 | 73 | 73 |
| Heat Distortion Temp, °C | 70 | 72 | 73 | 83 | ft-lbs/in. = foot-pounds per inch
psi = pounds-force per square inch
1 psi = 6.895 × $10^3$ Pa (Pascal)

TABLE II

PHYSICAL PROPERTIES OF BLENDS WITH A PET/EPDM RATIO OF 70/30

| Example | 5 | 6 | 7 | 8 | 9 |
|---|---|---|---|---|---|
| Level of DSA, eq/$10^6$ g PET | 0 | 10 | 20 | 40 | 60 |
| Wt % Based on Blend | 0 | .18 | .36 | .72 | 1.08 |
| Notched Izod Impact (¼" Specimen) | | | | | |
| ft-lbs/in | 2.5 | 13.8 | 13.2 | 8.3 | 1.9 |
| Type of Break | Complete | Partial | Partial | Partial | Complete |
| Tensile Properties | | | | | |
| Stress at Yield, psi | 3200 | 3000 | 3000 | 2900 | 2700 |
| Elongation at Yield, % | 8 | 5 | 4 | 4 | 4 |
| Stress at Break, psi | 2800 | 2500 | 2600 | 2400 | 2300 |
| Elongation at Break, % | | 200 | 130–220 | 40–170 | 10–30 |
| Flexural Properties | | | | | |
| Flex Strength, psi | 440 | 4200 | 4300 | 3300 | 3900 |
| Flex Modulus, psi × $10^3$ | 160 | 150 | 160 | 120 | 150 |
| Hardness, Shore D | 63 | 66 | 63 | 68 | 60 |
| Heat Distortion Temp, °C | 70 | 83 | 72 | 74 | 64 |

TABLE III

PHYSICAL PROPERTIES OF BLENDS WITH A PET/EPDM RATIO OF 50/50

| Example | 10 | 11 | 12 | 13 |
|---|---|---|---|---|
| Level of DSA, eq/$10^6$ g PET | 0 | 10 | 20 | 60 |
| Wt % Based on Blend | 0 | .13 | .26 | .80 |
| Notched Izod Impact (¼" Specimen) | | | | |
| ft-lbs/in | 7.7 | 9.9 | 9.3 | 8.7 |
| Type of Break | Partial | Partial | Partial | Partial |
| Tensile Properties | | | | |
| Stress at Yield, psi | — | 1700 | — | — |
| Elongation at Yield, % | — | 6–100 | — | — |
| Stress at Break, psi | 1434 | 1800 | 1500 | 1700 |
| Elongation at Break, % | | 165–185 | 95–120 | 20–25 |
| Flexural Properties | | | | |
| Flex Strength, psi | 1900 | 2300 | 1800 | 2100 |
| Flex Modulus, psi × $10^3$ | 71 | 87 | 73 | 82 |
| Hardness, Shore D | 44 | 55 | 54 | 54 |
| Heat Distortion Temp, °C | 63 | 67 | 64 | 65 |

The amounts of DSA added to each of these blends is given in the Tables on a weight percent basis and also based on equivalents of DSA per 1,000,000 g of PET (eq/$10^6$ g PET).

These examples demonstrate that impact strength of PET/EPDM blends can be improved by the addition of small quantities of DSA. For the three PET/EPDM compositions studied increases in impact strength were observed with the addition of 10 to 20 equivalents DSA/$10^6$ g PET but larger quantities proved to be detrimental to the impact resistance. The addition of DSA to the blends in general did not show any significant effect on the other physical properties.

The largest increase in impact strength was observed for the blends containing a PET/EPDM ratio of 70/30 (See Table II).

The blend in Example 5, which did not contain any DSA (dispersion stabilizer) had an impact strength of only 2.5 foot-pounds/inch. The blend in Example 6, which contained 0.18 weight percent DSA (10 equivalents of DSA per $10^6$ grams of PET) had an impact strength of 13.8 foot-pounds/inch. Thus, the addition of a small amount of dispersion stabilizer made the impact strength of this blend very substantially greater (compare Examples 5 and 6).

EXAMPLES 14 THROUGH 18

A series of PET/EPDM blends containing various amounts of Gulf PA-18 as the dispersion stabilizer were prepared. These blends were made by adding the appropriate amount of each of the components (Cleartuf ™ 7204, Nordel ™ 2744, and PA-18) to a one gallon (3.79 liter) can and then rolling it for a period of at least one hour. The resulting mixture was then fed into a one-inch Killion extruder equipped with a Maddox Mixing screw which was run at 125 RPM at a temperature of 550° F. (288° C.) under a nitrogen atmosphere. The extrudate was quenched in water and pelletized. It was then dried at a temperature of 212° F. to 230° F. (100° C. to 110° C.) for a period of at least about 15 hours in a vacuum oven. The blends were then injection molded on a Van Dorn injection molder having a 6 ounce (170 gram) injection capacity and having a clamp force of 75 tons. The mold was maintained at 70° F. (21° C.) to produce amorphous test specimens. The physical properties of the blends prepared by using this procedure were determined by employing the test methods specified in Examples 1 through 13. The physical properties of a blend containing a PET/EPDM ratio of 70/30 is shown in Table IV.

TABLE IV

| Example | 14 | 15 | 16 | 17 | 18 |
|---|---|---|---|---|---|
| Weight % PA-18 | 0.02 | 0.12 | 0.24 | .49 | .98 |
| Izod Impact Strength, ft-lbs./in | 16.0 | 14.8 | 15.5 | 15.6 | 10.9 |
| Flexural Modulus, psi × $10^3$ | 165 | 168 | 163 | 162 | 173 |
| Flexural Strength, psi | 4720 | 4790 | 4720 | 4710 | 4970 |
| Shore D | 65 | 66 | 65 | 65 | 68 |

The Gardner Impact Strength was determined to be 160 inch-pounds or greater for all of these examples (14–18).

The impact strength of these examples, which utilize Gulf PA-18 as the dispersion stabilizer, compare very favorably with the impact strength of like blends which do not contain a dispersion stabilizer. The blend in Example 5 which did not contain a dispersion stabilizer had an Izod Impact Strength of only 2.5 foot-pounds/inch and Examples 14–18 which utilize PA-18 as a dispersion stabilizer had Izod Impact Strengths between 10.9 and 16.0 foot-pounds/inch.

EXAMPLES 19 THROUGH 24

The same procedure that was specified in Examples 14 through 18 was utilized in these examples except that crystalline specimens were prepared by heating the amorphous specimens in a press at 356° F. (180° C.) for four minutes with minimal pressure. The physical properties of these crystalline blends containing a PET/EPDM ratio of 70/30 is shown in Table V.

TABLE V

| Example | 19 | 20 | 21 | 22 | 23 | 24 |
|---|---|---|---|---|---|---|
| Weight % PA-18 | 0 | 0.02 | 0.12 | 0.24 | 0.49 | 0.98 |
| Izod Impact Strength ft-lbs/in. | 1.19 | 1.96 | 1.43 | 1.87 | 2.03 | 1.49 |
| Gardner Impact Strength in-lbs | 50 | 80 | 80 | 160 | 160 | 50 |
| Flexural Modulus, psi × 10³ | 195 | 191 | 188 | 178 | 183 | 199 |
| Flexural Strength, psi | 6820 | 6220 | 6240 | 5910 | 6120 | 6580 |
| Shore D Hardness | 71 | 68 | 71 | 70 | 67 | 69 |

Examples 19 through 24 clearly show that the impact strength of crystalline blends can be greatly improved by employing the dispersion stabilizers of this invention. The blend in Example 19 which does not contain a dispersion stabilizer has a relatively low impact strength when compared with the blends in Examples 20–24 which employ PA-18 as the dispersion stabilizer. The impact strength obtained in the control (Example 19) should be substantially disregarded because similar controls on 70/30 PET/EPDM blends have had Izod Impact strengths that have ranged to as low as 0.8 ft-pounds/inch. Thus, the impact strength reported in Example 19 may be somewhat high. Widely varying Gardner impact strengths of PET/EPDM blends which contain 70 percent PET and 30 percent EPDM have also been obtained. These Gardner impact strengths have varied from as low as 16 inch-pounds to as high as 100 inch-pounds. This great fluctuation in the impact strengths that are obtained in such uncompatibilized blends is perhaps due to the fact that the blends are so incompatible that reproducible results are difficult to obtain.

COMPARATIVE EXAMPLES 1–5

In this series of experiments the same procedure described in Examples 19 through 24 was used except that AC Polyethylene 316A was used instead of PA-18 as the compatibilizing agent. AC Polyethylene 316A is a carboxylated polyethylene which is sold by Allied Chemical Corporation. The notched Izod impact strength, Gardner impact strength, Shore D hardness, tensile strength, and elongation at yield obtained by using various amounts of AC Polyethylene 316A in these 70/30 PET/EPDM blends are shown in Table VI.

TABLE VI

PET/EPDM BLENDS
EVALUATION OF AC316A POLYETHYLENE

| Sample | 1 | 2 | 3 | 4 | 5 |
|---|---|---|---|---|---|
| AC Polyethylene 316A, weight % | 0.1 | 0.25 | .49 | .99 | 1.96 |
| Notched Izod, ft-lbs/inch | 0.88 | 0.90 | 1.01 | 0.95 | 1.05 |
| Gardner Impact in-lbs | 32 | 16 | 48 | 40 | 48 |
| Shore D | 69 | 68 | 69 | 68 | 68 |
| Tensile, psi | 4550 | 4400 | 4400 | 4250 | 4400 |
| Elong at Yield, % | 11 | 8 | 10 | 9 | 9 |

The impact strength obtain in these PET/EPDM blends which were compatibilized with this carboxylated polyolefin had impact strengths which were actually lower than that obtained in the control (see Example 19). This series of experiments clearly indicates that PET/EPDM blends can not be compatibilized with carboxylated polyolefins.

Examples 20–24 show that PET/EPDM blends can be compatibilized with PA-18 so as to produce a material which has physical properties, including good impact strength, which make it suitable for a wide variety of purposes. This is in contrast to uncompatibilized blends of this type or blends containing carboxylated polyolefins which do not have satisfactory impact strengths.

While certain representative embodiments and details have been shown for the purpose of illustrating the invention, it will be apparent to those skilled in this art that various changes and modifications may be made therein without departing from the scope of the invention.

What is claimed:

1. A composition having a balance of properties suitable for molding purposes and having high impact resistance, said composition comprising an admixture of
    (a) from about 10 to about 90 percent by weight polyethylene terephthalate;
    (b) from about 10 to about 90 weight percent of at least one rubber selected from the group consisting of EPDM rubbers and EPR rubbers; and p1 (c) from about 0.001 to about 2.0 weight percent of at least one member selected from the group consisting of alkyl succinic anhydrides wherein said alkyl group contains from 8 to 30 carbon atoms, alkenyl succinic anhydrides wherein said alkenyl group contains from 8 to 30 carbon atoms, and dimers, oligomers, and polymers of the structural formula:

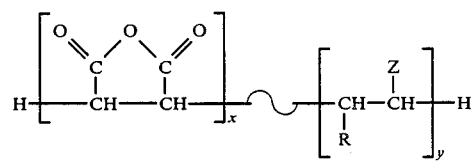

wherein x and y are integers, wherein R and Z can be the same or different, wherein R and Z are selected from the group consisting of alkyl moieties containing from 1 to 30 carbon atoms, alkenyl moieties containing from 2 to 30 carbon atoms, and hydrogen, wherein the total number of carbon atoms in R and Z is between 8 and 30, and wherein the ⌢ indicates that the repeat units can be distributed in any order.

2. A composition having a balance of properties suitable for molding purposes and having high impact resistance, said composition comprising an admixture of
    (a) from about 10 to about 90 percent by weight of a polymer with a structural formula selected from the group consisting of:

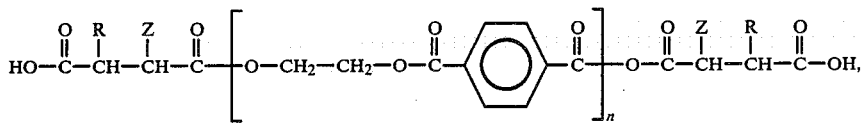

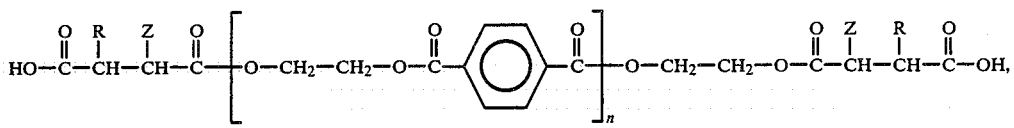

and

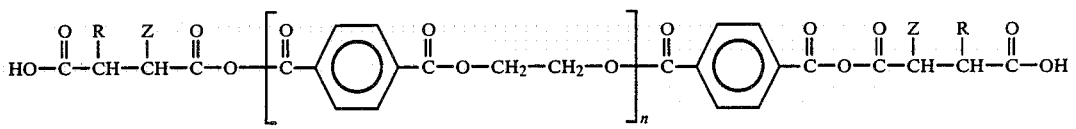

wherein n is an integer ranging from about 50 to about 750, wherein R and Z are members selected from the group consisting of alkyl groups containing from 8 to 30 carbon atoms, alkenyl moieties containing from 8 to 30 carbon atoms, and hydrogen, with the proviso that when R is a member selected from the group consisting of alkyl groups and alkenyl groups, then Z is hydrogen, and with the proviso that when Z is a member selected from the group consisting of alkyl groups and alkenyl groups, then R is hydrogen; and (b) from about 10 to about 90 weight percent of at least one rubber selected from the group consisting of EPDM rubbers and EPR rubbers.

3. A process for producing an impact resistant molding composition which comprises distributing throughout polyethylene terephthalate from about 10 to 90 weight percent, based on the total weight of the composition, of at least one member selected from the group consisting of EPDM rubbers and EPR rubbers and from about 0.001 to 2 weight percent, based on the total weight of the composition, of at least one member selected from the group consisting of alkyl succinic anhydrides, wherein said alkyl moiety contains from 8 to 30 carbon atoms; alkenyl succinic anhydrides, wherein said alkenyl moiety contains from 8 to 30 carbon atoms; and dimers, oligomers, and polymers of the structural formula:

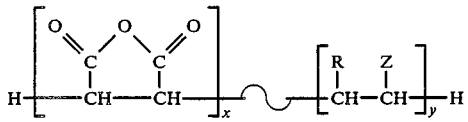

wherein x and y are integers, wherein R and Z can be the same or different, wherein R and Z are members selected from the group consisting of alkyl groups containing from 8 to 30 carbon atoms, alkenyl groups containing 8 to 30 carbon atoms, and hydrogen, wherein the total number of carbon atoms in R and Z is between 8 and 30, and wherein ⌢ indicates that the repeat units can be distributed in any order, at a temperature of about 260° C. to about 300° C.

4. A composition having a balance of properties suitable for molding purposes and having high impact resistance, said composition comprising an admixture of (a) from about 10 to about 90 percent by weight of a polymer which is the reaction product of PET and at least one member selected from the group consisting of dimers, oligomers, and polymers with the structural formula:

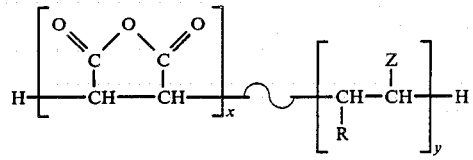

wherein x and y are integers, wherein R and Z can be the same or different, wherein R and Z are selected from the group consisting of alkyl moieties containing from 1 to 30 carbon atoms, alkenyl moieties containing from 2 to 30 carbon atoms, and hydrogen, wherein the total number of carbon atoms in R and Z is between 8 and 30, and wherein the ⌢ indicates that the repeat units can be distributed in any order; and (b) from about 10 to about 90 weight percent of at least one rubber selected from the group consisting of EPDM rubbers and EPR rubbers.

5. A composition as specified in claim 1 wherein from about 0.005 to about 1 weight percent of at least one member selected from the group consisting of alkyl succinic anhydrides wherein said alkyl group contains from 8 to 30 carbon atoms, alkenyl succinic anhydrides wherein said alkenyl group contains from 8 to 30 carbon atoms, and dimers, oligomers, and polymers of the structural formula:

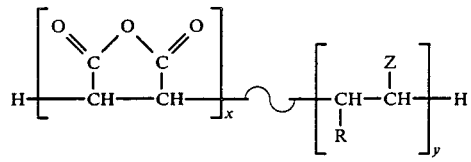

wherein x and y are integers, wherein R and Z can be the same or different, wherein R and Z are selected from the group consisting of alkyl moieties containing from 1 to 30 carbon atoms, alkenyl moieties containing from 2 to 30 carbon atoms, and hydrogen, wherein the total number of carbon atoms in R and Z is between 8 and 30, and wherein the ⌒⌣ indicates that the repeat units can be distributed in any order, is present in said admixture.

6. A process as specified in claim 3 wherein from about 0.005 to about 1 weight percent of at least one member selected from the group consisting of alkyl succinic anhydrides wherein said alkyl group contains from 8 to 30 carbon atoms, alkenyl succinic anhydrides wherein said alkenyl group contains from 8 to 30 carbon atoms, and dimers, oligomers, and polymers of the structural formula:

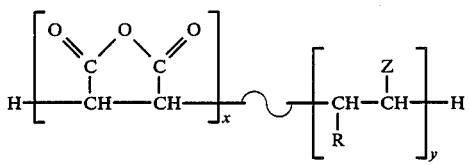

wherein x and y are integers, wherein R and Z can be the same or different, wherein R and Z are selected from the group consisting of alkyl moieties containing from 1 to 30 carbon atoms, alkenyl moieties containing from 2 to 30 carbon atoms, and hydrogen, wherein the total number of carbon atoms in R and Z is between 8 and 30, and wherein ⌒⌣ indicates that the repeat units can be distributed in any order, is distributed throughout said polyethylene terephthalate.

7. A composition as specified in claim 5 from about 0.1 to about 0.5 weight percent of at least one member selected from the group consisting of alkyl succinic anhydrides wherein said alkyl group contains from 8 to 30 carbon atoms, alkenyl succinic anhydrides wherein said alkenyl group contains from 8 to 30 carbon atoms, and dimers, oligomers, and polymers of the structural formula:

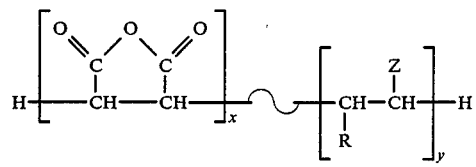

wherein x and y are integers, wherein R and Z can be the same or different, wherein R and Z are selected from the group consisting of alkyl moieties containing from 1 to 30 carbon atoms, alkenyl moieties containing from 2 to 30 carbon atoms, and hydrogen, wherein the total number of carbon atoms in R and Z is between 8 and 30, and wherein the ⌒⌣ indicates that the repeat units can be distributed in any order, is present in said admixture.

8. A process as specified in claim 6 wherein from about 0.01 to 0.5 weight percent, based on the total weight of the composition, of at least one member selected from the group consisting of alkyl succinic anhydrides, wherein said alkyl moiety contains from 8 to 30 carbon atoms; alkenyl succinic anhydrides, wherein said alkenyl moiety contains from 8 to 30 carbon atoms; and dimers, oligomers, and polymers of the structural formula:

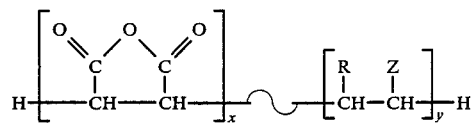

wherein x and y are integers, wherein R and Z can be the same or different, wherein R and Z are members selected from the group consisting of alkyl groups containing from 8 to 30 carbon atoms, alkenyl groups containing 8 to 30 carbon atoms, and hydrogen, wherein the total number of carbon atoms in R and Z is between 8 and 30, and wherein ⌒⌣ indicates that the repeat units can be distributed in any order, is distributed throughout said polyethylene terephthalate.

9. A composition as specified in claim 1 wherein said admixture contains from about 40 to about 85 weight percent PET and from about 15 to about 60 weight percent of at least one rubber.

10. A composition as specified in claim 2 comprising an admixture of
(a) from about 40 to about 85 percent by weight of a polymer with a structural formula selected from the group consisting of:

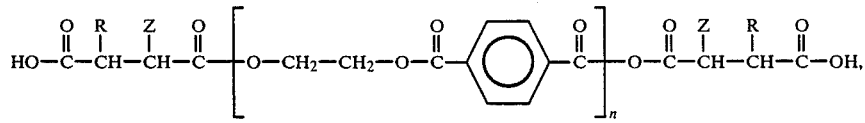

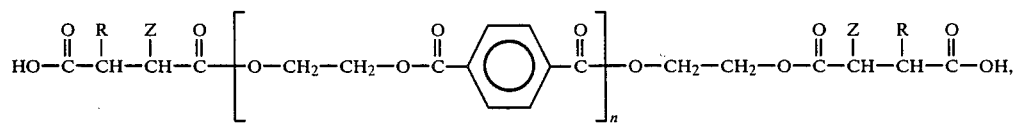

and

-continued

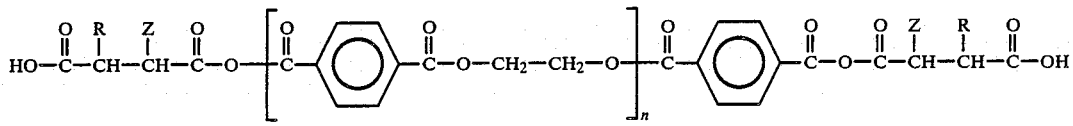

wherein n is an integer ranging from about 100 to about 250, wherein R and Z are members selected from the group consisting of alkyl groups containing from 8 to 30 carbon atoms, alkenyl moieties containing from 8 to 30 carbon atoms, and hydrogen, with the proviso that when R is a member selected from the group consisting of alkyl groups and alkenyl groups, then Z is hydrogen, and with the proviso than when Z is a member selected from the group consisting of alkyl groups and alkenyl groups, then R is hydrogen; and (b) from about 15 to about 60 weight percent of at least one rubber selected from the group consisting of EPDM rubbers and EPR rubbers.

11. A process as specified in claim 3 wherein from about 15 to about 60 weight percent of said members selected from the group consisting of EPDM rubbers and EPR rubbers is distributed throughout said polyethylene terephthalate.

12. A composition as specified in claim 1 wherein said dimers, oligomers, and polymers have the structural formula

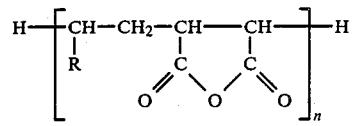

wherein R is an alkyl or alkenyl moiety containing from 8 to 30 carbon atoms and wherein n is an integer from 1 to about 300.

13. A process as specified in claim 3 wherein said dimers, oligomers, and polymers have the structural formula

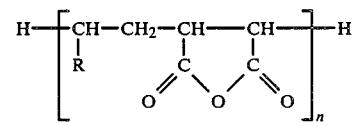

wherein R is an alkyl or alkenyl moiety containing from 8 to 30 carbon atoms and wherein n is an integer from 1 to about 300.

14. A composition as specified in claim 1 wherein the total of x and y is from 2 to about 500.

15. A process as specified in claim 3 wherein the total of x and y is from 2 to about 500.

16. A composition as specified in claim 12 wherein said dimers, oligomers and polymers have the structural formula:

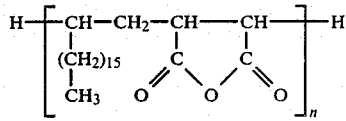

wherein n is about 150.

17. A process as specified in claim 13 wherein said dimers, oligomers and polymers have the structural formula:

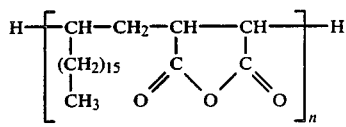

wherein n is about 150.

18. A composition as specified in claim 4 wherein the total of x and y is from 2 to about 500.

19. A composition as specified in claim 4 wherein said composition comprises an admixture of from about 40 to about 85 weight percent of said reaction product and from about 15 to about 60 weight percent of said rubber.

20. A composition as specified in claim 19 wherein said composition comprises an admixture of from about 60 to about 80 weight percent of said reaction product and from about 20 to about 40 weight percent of said rubber.

* * * * *